Jan. 7, 1964 C. ROSAIN ETAL 3,117,244
ALTERNATING CURRENT MOTORS
Filed March 25, 1960 3 Sheets-Sheet 1

Jan. 7, 1964   C. ROSAIN ETAL   3,117,244
ALTERNATING CURRENT MOTORS
Filed March 25, 1960   3 Sheets-Sheet 2

Jan. 7, 1964  C. ROSAIN ETAL  3,117,244
ALTERNATING CURRENT MOTORS
Filed March 25, 1960  3 Sheets-Sheet 3

3,117,244
ALTERNATING CURRENT MOTORS
Claude Rosain, 50 Rue Raynouard, and Georges Stcherbatcheff, 29 Ave. la Bourdonnais, both of Paris, France
Filed Mar. 25, 1960, Ser. No. 17,652
Claims priority, application France Mar. 25, 1959
13 Claims. (Cl. 310—82)

The present invention relates to alternating current motors. More particularly, it is an object of the invention to provide a motor which has a very low rotation speed without it being necessary to associate therewith a speed reducer.

The invention provides a motor of the rotating field type. However, a basic difference between a motor according to the invention and conventional rotating field motors is that its rotor, instead of rotating with a shaft journalled in the stator, is adapted for rolling along suitable rollways arranged in the stator structure.

Generally, the invention provides an alternating current motor having means for providing a rotary field and wherein the rotor comprises rollers for rolling on rollways carried by the stator, which is positioned within a casing to which it is connected through a suspension arrangement, while the rotor is connected to an output shaft, otherwise independent thereof and journalled in said casing, through another suspension arrangement, both suspensions allowing lateral freedom by providing torsional rigidity.

The invention will be best understood from the ensuing description taken in conjunction with the accompanying drawing, wherein.

Figure 1:
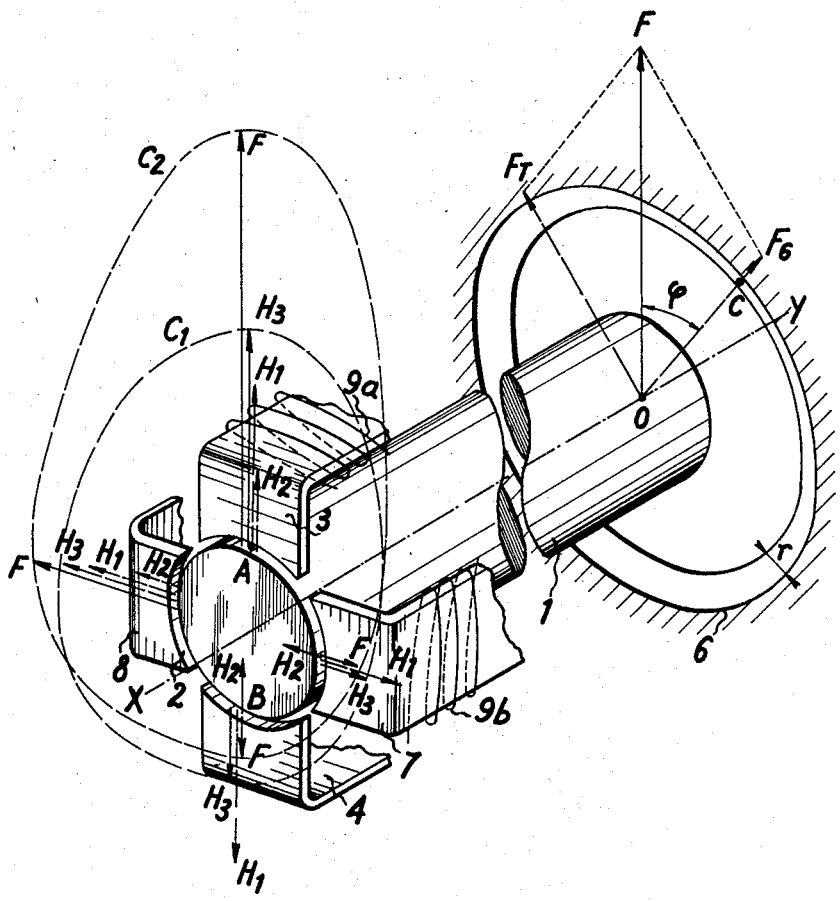
FIG. 1 is a general diagram illustrating the operating principle of a motor according to the invention.

The diagram of FIG. 1 shows a rotor 1 mounted for rotating around its axis XY and generally separated by an air-gap 2 from the stator. The rotation occurs under the action of a radial rotary force F. To this end, the rotor and the stator being of a magnetic material, a fixed magnetic field $H_1$ and a rotary magnetic field $H_2$, having an angular speed $\omega$, may be provided. For example, rotor I may comprise a permanent magnet arrangement providing a uniform field which is radial and symmetrical with respect to its axis of revolution. Rotary field may be provided in any known manner, for example by means of polar pieces 3, 4 and 7, 8, having respective windings 9a and 9b which are fed with alternating current having a rotational frequency $\omega$ with a phase shift equal to $\pi/2$ between the two windings.

It may be readily seen that fields $H_1$, and $H_2$ add at A and subtract from each other at B, the resulting field $H_3$ being at a maximum at A and at a minimum at B. This is shown in FIG. 1 by curve $C_1$ which rotates at the same angular speed $\omega$ as the rotating field $H_2$.

The attraction force, existing under the conditions stated between the polar pieces and the rotor, being proportional to the square of the resulting field $H_3$, the distribution of forces around the rotor is even more anisotropic than the field distribution. This is shown in FIG. 1 by curve $C_2$.

Under the action of force F, rotor I rolls with respect to a rollway 6 which, according to the invention, does not coincide with the inner periphery of the stator and has for this reason been separately represented in the very diagrammatic showing of FIG. 1. The rotation occurs substantially without slipping. The clearance $r$ between the rolling part 5 of the rotor and the rollway 6 should be preferably small. Under these conditions, the movement of the rotor part 5 is substantially the same as though the rotor part 5 were rotating about axis XY at an angular speed $\Omega$ which is equal to $\omega r/R$, R being the radius of the rotor part 5. Provided an output shaft is coupled to the rotor part 5 through the intermediary of a suitable suspension arrangement, as will be shown later in more detail, power is available on this output shaft which rotates with a speed that has undergone a substantial reduction with respect to angular speed $\Omega$. Simultaneously with this rotary movement, a parasitic movement occurs whose amplitude is $r$ and whose frequency is $\omega$. This is why suspension arrangements are necessary.

In FIG. 1, polar pieces 3, 4 and 7, 8 are located at right angles to each other, the alternating current flowing in the winding of one pair of polar pieces having a phase shift $\pi/2$ with respect to that flowing in the winding of the other pair, and the angular frequency being $\omega$. This provides the desired rotary field. Of course, any other system could be used for providing a rotary field, for example a three phase stator winding similar to that of a synchronous motor.

Needless to say, the explanation of the rotation of the rotor part 5 given hereinabove is only approximative and tentative and the applicants do not rely on any particular explanation, their invention being primarily concerned with a new motor as such. In particular the structure is in actual fact never perfectly symmetrical with respect to the axis of the rotor. It follows that in its rest position, i.e. in the absence of the rotary field, the rotor part contacts the stator in a radial direction which is in fact a "privileged" direction.

It should also be noted that the rotating force F may be resolved into a force $F_c$ which tends to apply the rotor, or the rolling part of it to the rollway, and a tangential force F which causes the rotor to roll. The latter becomes all the more important as the rotor is loaded, the angle $\alpha$ between the resultant force $F_1$ and the vertical increasing much in the same manner as the angle between the rotor field and the rotating field increases in a synchronous motor, as the output torque of the latter increases. It is important that there be sufficient friction between the rolling surfaces of the rotor and the rollway to avoid any slippage.

One of the advantages of a motor according to the invention is that its inertia is very low and the starting output torque great. This is in particular due to the fact that the air-gap between the rotor and the stator can be as small as 1 mm. or even less.

Figure 2:
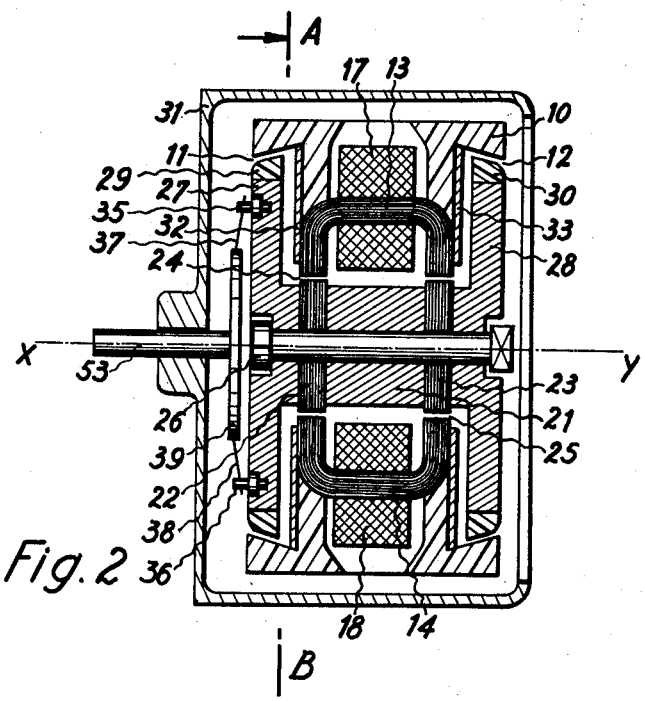
FIG. 2 shows an axial section through a motor according to the invention.
Figure 3:
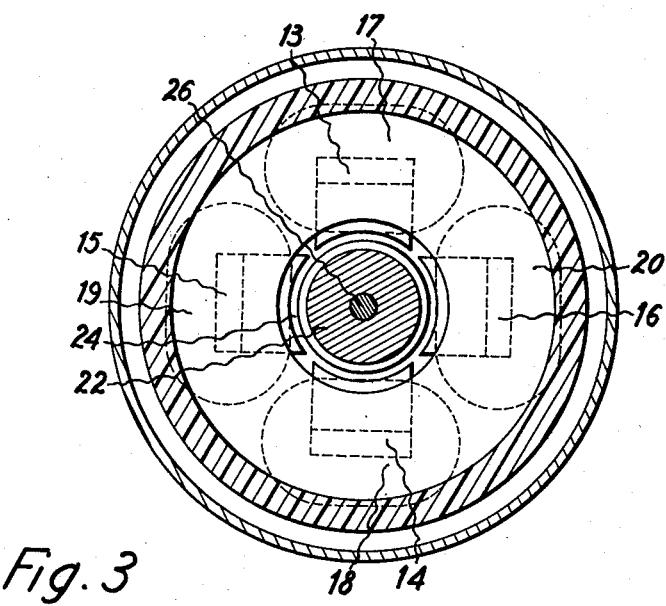
FIG. 3 shows a section of the motor of FIG. 2 along line A—B.

FIGS. 2 and 3 show a preferred embodiment of a motor according to the invention.

According to this embodiment a stator 10, which may be, for example, cylindrical in shape and made of some light alloy or of a plastic material, has formed therein two circular rollways or races 11 and 12, which are preferably inclined with respect to the axis XY of the motor, thus forming a truncated cone. Two plates 32 and 33 support magnetic cores 13 and 14 in a first plane comprising axis XY and cores 15 and 16 in a second plane comprising this axis and normal to the former, as shown in FIG. 3. Cores 13 to 16 carry respective windings 17 to 20.

The rotor comprises a cylindrical magnet 21 which is carried by a shaft 26 and carries circular polar pieces 22 and 23, which are preferably laminated as are cores 13 to 16. Polar pieces 22 and 23 are separated from magnetic cores 13 to 16 by air-gaps 24 and 25. As already mentioned, the air-gaps are very small, having a width of, for example, 1 mm. or .5 mm.

Shaft 26 also carries at its outer ends two nonmagnetic discs or rollers 27 and 28 which correspond to rollways 11 and 12 and have their rims formed with a material providing a substantial friction when in contact with the rollways, for example of rubber. Rims 30 have their outer surface inclined in the same way as the surface of rollways 10 and 11.

The stator assembly is resiliently suspended within a stationary casing 31 and the rotor is connected through another suspension assembly to the output shaft 53 which is journalled in casing 31 and is otherwise independent of the rotor. An embodiment of the stator suspension is shown in FIG. 5 and an embodiment of the rotor suspension is shown in FIG. 4.

Figure 4:
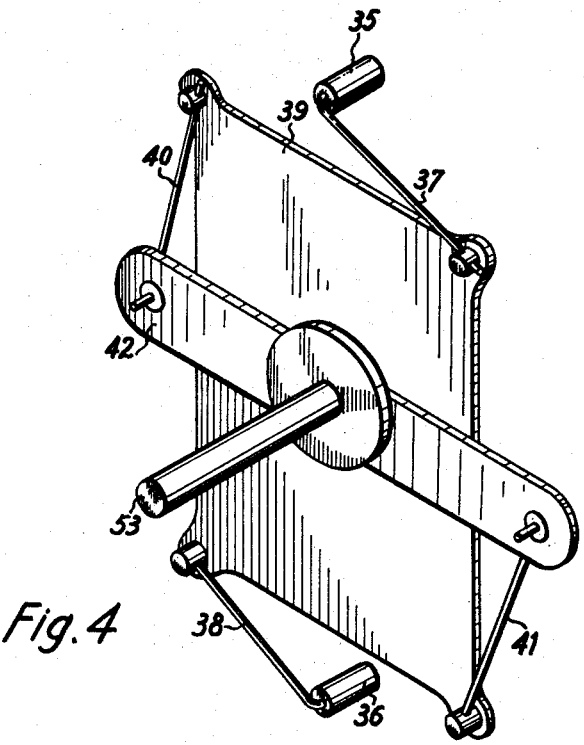
FIG. 4 shows diagrammatically and in perspective, a suspension arrangement between the rotor and the output shaft of the motor of FIG. 2.

The rotor suspension arrangement as shown in FIG. 4 comprises a rigid plate 39. (Also shown in FIGURE 2.) Two diagonally opposed corners of plate 39 carry elongated flat spring leaves 37 and 38, connected thereto by their ends. The opposite ends of spring leaves 37 and 38 are mounted into bushings 35 and 36 which are integrally connected to diametrically opposite points of roller 27 or 28, as shown in FIGURE 2. The two remaining corners of the plate 39 carry similar springs 40 and 41, whose opposite ends are mounted into the ends of a bar 42, to the middle portion of which a stub shaft 53, which is the output shaft of the motor as shown in FIG. 2, is rigidly connected.

Figure 5:
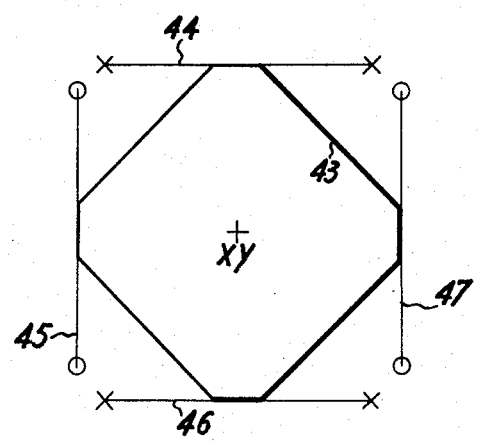
FIG. 5 shows the suspension arrangement of the stator.

In the embodiment shown in FIG. 5, the stator arrangement comprises a generally square shaped plate 43 to the four corners of which four spring leaves 44 to 47 are rigidly connected, one end of each spring being connected to stator 10 and the other to casing 31.

Thus, both stator 10 and rotor 21, the latter through the bearing of its output shaft 33, are resiliently connected to casing 31 through the suspension arrangements shown in FIGS. 5 and 4 respectively.

Broadly the suspension arrangement comprises two pairs of elongated springs which may be flat as mentioned so far as have any other section. The springs of each pair are connected to two ends of a lever, the two levers being integrally associated in the embodiment shown to form a plate. The springs of one pair are in rest position normal to those of the other and have a twofold symmetry with respect to axis XY. The springs are rigid in the longitudinal direction so that the torque is rigidly transmitted to the output shaft 33, two of them being submitted to a compression strain and two to a tractive strain. At the same time the spring can with great resiliency undergo flexing stresses under the action of other displacements of the rotor than the rotation thereof, such as vibrations referred to above.

It should also be noted that the rigidity of the springs must be proportional to the respective masses of the pieces they interconnect in order for the casing to be submitted to zero resultant force and torque. This is readily achieved with elongated springs whose rigidity is readily selected.

The stator suspension must have a good torsional rigidity and must not give rise to any displacement having a component parallel to the motor axis under the action of a load perpendicular to said axis. This will avoid parasitic oscillations.

These requirements are with the system described.

They could also be met with an arrangement comprising four cantilever springs.

The two pairs of windings 17, 18 and 19, 20 are connected to an alternating current source with a phase shift equal to between the two sources, thus providing a magnetic field which rotates with an angular speed.

In cooperation with the rotor magnetic field this field causes the rotor to roll on the rollways, as explained above, practically without slippage.

The invention is of course not limited to the embodiments shown, which are given only by way of example.

What is claimed is:

1. A motor comprising a casing; a stator within said casing, said stator having a magnetic circuit and two outer portions having respective rollways; a suspension arrangement connecting said stator to said casing; a cylindrical rotor having a magnetic body for providing therein a constant radial magnetic field, said body having frontal surfaces; two circular magnetic circuit portions, associated with said stator magnetic circuit and adjacent said frontal surfaces and two rollers respectively located outwardly with respect to said circuit portions coaxial with said rotor and rigidly connected thereto for respectively rolling on said rollways; an output half shaft journalled in said casing; a suspension arrangement connecting said shaft to one of said rollers for rotation therewith; and means for providing a rotary magnetic field in said rotor.

2. A motor comprising a casing; a stator within said casing; a suspension arrangement connecting said stator to said casing; said stator having a magnetic circuit and, two outer portions having respective rollways; a cylindrical rotor having a permanent magnet body providing a constant radial magnetic field, said body having frontal surfaces; circular magnetic circuits portions associated with said stator magnetic circuit and rigidly connected to said frontal surfaces and rollers coaxial with said rotor and rigidly connected to said circiut portions outwardly thereof for respectively rolling on said rollways; a winding carried by said stator magnetic circuit for providing a rotary field in said rotor; an output shaft journalled in said casing; a suspension arrangement, forming the only connection between said shaft and said rotor, connected to said shaft and one of said rollers for rotation with the rotor, said rollers having a greater diameter than said rotor body.

3. A motor comprising a casing; a stator within said casing; said stator having two pairs of polar pieces carrying respective pairs of windings and two non-magnetic outer portions having respective rollways means for providing a phase shift equal to $\pi/2$ between said pairs of windings; a cylindrical rotor having a permanent magnet body providing a constant radial magnetic field having circular magnetic circuit portions associated with said stator magnetic circuit and non-magnetic rollers coaxial with said rotor and rigidly connected thereto for respectively rolling on said rollways; an output shaft journalled in said casings; and a suspension arrangement for connecting said shaft to one of said rollers for rotation therewith.

4. A motor comprising a casing; a stator within said casing, said stator having two pairs of polar pieces carrying respective pairs of windings and two non-magnetic outer portions having respective rollways; means for providing a phase shift equal to $\pi/2$ between said pairs of windings; a cylindrical rotor having a permanent magnet body providing a constant radial magnetic field, said body having frontal surfaces; circular magnetic circuit portions associated with said stator magnetic circuit and rigidly connected to said frontal surfaces and rollers coaxial with said rotor and rigidly connected to said circuit portions outwardly thereof for respectively rolling in said rollways; an output shaft journalled in said casing; a suspension arrangement, forming the only connection between said shaft and said rotor, connected to said shaft and one of said rollers for rotation with the rotor, said rollers having a greater diameter than said rotor body.

5. A motor comprising a casing; a stator within said casing; a suspension arrangement connecting said stator to said casing; said stator having a magnetic circuit and two outer portions having respective rollways; a cylindrical rotor having a permanent magnet body providing a constant radial magnetic field, said body having frontal surfaces; circular magnetic circuits portions associated with said stator magnetic circuit and rigidly connected to said frontal surfaces and rollers coaxial with said rotor and rigidly connected to said circuit portions outwardly thereof for respectively rolling on said rollways; a winding carried by said stator magnetic circuit for providing a rotary field in said rotor; an output shaft journalled in said casing; a suspension arrangement comprising two pairs of elongated spring means which are rigid in so far as compression, and pulling strains are concerned and resilient in so far as flexing strains are concerned, said spring means respectively having first and second ends; said first ends of one pair of spring means being associated with said output shaft and said first ends of the other pair being associated with said rotor, means for interconnecting said second ends of the springs of each pair forming levers therewith, the assembly having in the state of rest a twofold symmetry with respect to the rotor axis.

6. A motor comprising a casing; a stator within said casing; a suspension arrangement connecting said stator to said casing; said stator having a magnetic circuit and two outer portions having respective rollways; a cylindrical rotor having a permanent magnet body providing a constant radial magnetic field, said body having frontal surfaces; circular magnetic circuits portions associated with said stator magnetic circuit and rigidly connected to said frontal surfaces and rollers coaxial with said rotor and rigidly connected to said circuit portions outwardly thereof for respectively rolling on said rollways; a winding carried by said stator magnetic circuit for providing a rotary field in said rotor; an output shaft journalled in said casing; a suspension arrangement comprising two pairs of elongated spring leaves which are rigid in so far as compression and pulling strains are concerned and resilient in so far as flexing strains are concerned, said springs leaves respectively having first and second ends, said first ends of one pair of springs being associated with two diametrally opposed points of one of said rollers; a bar having a median portion rigidly connected to said shaft, said bar having two ends, said first ends of the other pair of springs being connected to said ends; and a rigid plate having two pairs of diagonally opposed corners, said second ends of each pair being connected to diametrally opposed corners.

7. An electric motor comprising: a support member; a stator; a suspension arrangement connecting said stator to said support member; a rotor in rolling engagement with said stator; an output shaft; means for creating a rotary magnetic field in said rotor; and a suspension arrangement connecting said rotor to said shaft, said suspension arrangement comprising two pairs of elongated spring means which are rigid in so far as compression and pulling strains are concerned and resilient in so far as flexing strains are concerned, said spring means respectively having first and second ends; said first ends of one pair of spring means being associated with said output shaft and said first ends of the other pair being associated with said rotor; means for interconnecting said second ends of the springs of each pair forming levers therewith.

8. An electric motor comprising: a support member; a stator having rollways means; a suspension arrangement connecting said stator to said support member; a rotor having roller means in rolling engagement with said rollways means; an output shaft; means for creating a rotary magnetic field in said rotor; and a suspension arrangement connecting said rotor to said shaft, said suspension arrangement comprising: two pairs of elongated spring means which are rigid in so far as compression and pulling strains are concerned and resilient in so far as flexing strains are concerned, said spring means respectively having first and second ends, said first ends of one pair of spring means being associated with said output shaft and said first ends of the other pair being associated with one of said rollers; means for interconnecting said second ends of the springs of each pair forming levers therewith, the assembly having in the state of rest a two fold symmetry with respect to the rotor axis.

9. An electric motor comprising: a support member; a stator; a suspension arrangement connecting said stator to said support member; a rotor in rolling engagement with said stator; an output shaft; means for creating a rotary magnetic field in said rotor; and a suspension arrangement connecting said rotor to said shaft, said suspension arrangement comprising two pairs of elongated spring leaves which are rigid in so far as compression and pulling strains are concerned and resilient in so far as flexing strains are concerned, said spring leaves respectively having first and second ends, said first ends of one pair of springs being associated with two diametrally opposed points of one of said rollers; a bar having a median portion rigidly connected to said shaft, said bar having two ends, said first ends of the other pair of springs being connected to said ends; and a rigid plate having two pairs of diagonally opposed corners, said second ends of each pair being connected to diametrally opposed corners.

10. An electric motor comprising: a casing; a stator within said casing; said stator having a magnetic circuit and two rollways; a suspension arrangement connecting said stator to said casing; a rotor surrounded by said stator and having a magnetic circuit associated with said stator magnetic circuit; means for exciting a rotary magnetic field in said rotor; two rollers rigidly associated with said rotor and respectively positioned for rolling on said rollways; an output shaft journalled in said casing; and a suspension arrangement connecting said shaft to one of said rollers for rotation therewith, said suspension arrangement comprising: two pairs of elongated spring means which are rigid in so far as compression and pulling strains are concerned and resilient in so far as flexing strains are concerned, said spring means respectively having first and second ends; said first ends of one pair of spring means being associated with said output shaft and said first ends of the other pair being associated with said rotor; means for interconnecting said second ends of the spring means of each pair forming levers therewith.

11. An electric motor comprising: a casing; a stator within said casing; said stator having a magnetic circuit and two rollways; a suspension arrangement connecting said stator to said casing; a rotor surrounded by said stator, having means for providing therein a constant magnetic field and having a magnetic circuit associated with said stator magnetic circuit; means for exciting a rotary magnetic field in said rotor; two rollers rigidly associated with said rotor and respectively positioned for rolling on said rollways; an output shaft journalled in said casing; and a suspension arrangement connecting said shaft to one of said rollers for rotation therewith; said suspension arrangement comprising: two pairs of elongated spring means which are rigid in so far as compression and pulling strains are concerned and resilient in so far as flexing strains are concerned, said spring means respectively having first and second ends, said first ends of one pair of spring means being associated with said output shaft and said first ends of the other pair being associated with said rotor; means for interconnecting said second ends of the spring means of each pair forming levers therewith.

12. An electric motor comprising: a casing; a stator within said casing; a suspension arrangement connecting said stator to said casing; said stator having a magnetic circuit, and two nonmagnetic outer portions having respective rollways; a cylindrical rotor having a magnetic body for providing therein a constant radial magnetic field; circular magnetic circuit portions associated with said stator magnetic circuit and nonmagnetic rollers coaxial with said rotor rigidly connected therewith and positioned for respectively rolling on said rollways; an output shaft journalled in said casing; means for providing a rotary magnetic field in said rotor; and a suspension arrangement connecting said shaft to one of said rollers for rotation therewith, said suspension arrangement comprising two pairs of elongated spring leaves which are rigid in so far as compression and pulling strains are concerned and resilient in so far as flexing strains are concerned, said spring leaves respectively having first and second ends, said first ends of one pair of spring leaves being associated with two diametrally opposed points of one of said rollers; a bar having a median portion rigidly connected to said shaft, said bar having two ends, said first ends of the other pair of springs being connected to said ends; and a rigid plate having two pairs of diagonally opposed corners, said second ends of each pair being connected to diametrally opposed corners.

13. An electric motor comprising: a casing; a stator within said casing; a suspension arrangement connecting said stator to said casing, said stator having a magnetic circuit and two nonmagnetic outer portions having respective rollways in the shape of truncated cones; a cylindrical rotor having a magnetic body for providing therein a constant radial magnetic field; circular magnetic circuit portions associated with said stator magnetic circuit and nonmagnetic rollers coaxial with said rotor rigidly connected therewith and positioned for respectively rolling on said rollways, said rollers being in the shape of truncated cones; means for providing a high degree of friction between said rollers and said rollways; an output shaft journalled in said casing; means for providing a rotary magnetic field in said rotor; and a suspension arrangement connecting said shaft to one of said rollers for rotation therewith, said suspension arrangement comprising two pairs of elongated spring leaves which are rigid in so far as compression and pulling strains are concerned and resilient in so far as flexing strains are concerned, said spring leaves respectively having first and second ends, said first ends of one pair of springs being associated with two diametrally opposed points of one of said rollers; a bar having a median portion rigidly connected to said shaft, said bar having two ends, said first ends of the other pair of spring leaves being connected to said ends; and a rigid plate having two pairs of diagonally opposed corners, said second ends of each pair being connected to diametrally opposed corners.

References Cited in the file of this patent
UNITED STATES PATENTS

| | | |
|---|---|---|
| 2,275,827 | Plensler | Mar. 10, 1942 |
| 2,378,669 | Vickers | June 19, 1945 |
| 2,871,382 | Bouvier | Jan. 27, 1959 |